Patented Aug. 11, 1936

2,050,930

UNITED STATES PATENT OFFICE 2,050,930

PROCESS FOR BREAKING PETROLEUM EMULSIONS

Melvin De Groote, St. Louis, Mo., assignor to Tretolite Company, Webster Groves, Mo., a corporation of Missouri No Drawing. Application December 21, 1935, Serial No. 55,617

4 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil" "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in my process consists of a chemical compound characterized by the presence of both an oxy-hendecenoic acid residue and a dicarboxy acid residue in the same molecule; said discarboxy acid residue being derived from an acid of the formula type $(CH_2)_n(COOH)_2$, in which $n$ has a value of at least 5 and not more than 8.

In U. S. Letters Patent No. 2,023,996 to Melvin De Groote and Bernhard Keiser, dated December 10, 1935, there is described a process for breaking petroleum emulsions by means of oxy-hendecenoic acid materials. As stated in said patent, hendecenoic acid is an unsaturated acid apparently not similar to certain fatty acids, but apparently not occurring naturally in any fat or oil. It is a lower homologue of oleic acid and is obtained by distilling ricinoleic acid or the glyceride thereof (castor oil) under diminished or atmospheric pressure. It is sometimes known as undecylenic acid. Its formation from ricinoleic acid, for example, is indicated by the following reaction:

$$C_{18}H_{34}O_3 = C_6H_{13}CHO + C_{11}H_{20}O_2$$

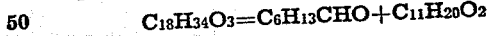

In preparing the treating agent or demulsifying agent employed in the present process, it is not necessary that the hendecenoic acid, which is employed as a raw material, be absolutely pure, but it may be of a technical quality so as to contain some unconverted castor oil and certain products of decomposition other than hendecenoic acid. It may contain some oenanthol (heptoic aldehyde). This aldehyde can be removed by blowing air or an inert gas through the commercial hendecenoic acid at a relatively low temperature.

Oxy-hendecenoic acid bodies are derived from hendecenoic acid of technical purity in various manners, such as those outlined in the aforementioned De Groote and Keiser patent. One method employed is to form the fatty sulfates with subsequent hydrolysis. Another method is dependent upon oxidation or hydroxylation under certain controlled conditions. For example, hendecenoic acid of technical purity may be subjected to air oxidation by any of the methods conventionally employed for oxidation of castor oil, and the like. In producing the demulsifying agent employed in my process, I prefer to use a temperature of 125° to 135° C., and employ approximately 45 to 75 lbs. gauge pressure. If desired, hendecenoic acid may be oxidized at a higher temperature by means of air or oxygen at atmospheric pressure.

I have referred to the product obtained by oxidizing hendecenoic acid as "oxy-hendecenoic acid". The expression "oxy-hendecenoic acid" is intended to refer to the derivatives in which additional oxygen has been introduced into the molecules. For instance, this may be in the manner indicated by the formula $C_{11}H_{20}O_3$. This represents the saturation of the ethylene linkage by means of an atom of oxygen. It is believed that oxidation, especially with moist air, results in the conversion of this added oxygen atom into two hydroxyl radicals, so that ultimately one apparently obtains dihydroxyhendecatoic acid, as indicated by the formula $C_{11}H_{20}(OH)_2O_2$. In other words, the addition product of hendecenoic acid is the substitution product, at least hypothetically, of hendecatoic acid.

As further stated in said De Groote and Keiser patent, it is immaterial whether there be introduced an oxygen atom or two hydroxyl radicals in the hendecenoic acid body to produce the oxy-hendecenoic acid body. It is obvious, of course, where a hydroxyl is formed, that one has a hydroxylated fatty acid or hydroxylated fatty acid compound, and that the fatty acid at least may act either as an alcohol or as an acid in the same sense that ricinoleic acid, for example, may act as an alcohol or acid.

In another U. S. Letters Patent to said Melvin

De Groote and Bernhard Keiser, No. 2,023,995, dated December 10, 1935, there is disclosed a process for breaking emulsions by means of esters derived by reaction between a dibasic acid of the type $(CH_2)_n(COOH)_2$ in which $n$ has a value of at least 5 and not more than 8, and a hydroxylated fatty body such as ricinoleic acid, triricinolein, etc. More specifically, the dibasic carboxy acids employed to produce the demulsifying agent used in the process of said last mentioned application for patent includes the following:

Pimelic acid $(HOOC(CH_2)_5COOH)$
Suberic acid $(HOOC(CH_2)_6COOH)$
Azelaic acid $(HOOC(CH_2)_7COOH)$
Sebacic acid $(HOOC(CH_2)_8COOH)$ My present process, as differentiated from the processes of the two De Groote and Keiser patents previously mentioned, is characterized by the fact that in my present process I employ a demulsifying agent of a kind in which there is present in the same molecule, both an oxy-hendecenoic acid residue and a dibasic carboxy acid residue derived from an acid of the type $(CH_2)_n(COOH)_2$, in which $n$ has a value of at least 5 and not more than 8. The formation of such materials is relatively simple, since the oxy-hendecenoic acid may represent the acid alcohol type of reagent. In the same sense that ricinoleic acid is an acid alcohol, one may obtain the same reaction from one molecule of oxy-hendecenoic acid, and one molecule of the dibasic carboxy acid as one would obtain from a molecule of ricinoleic acid and a molecule of oxalic acid. Thus, one may form a new acid having two carboxyl radicals by esterification between one of the carboxylic hydrogens of the dibasic carboxy acid and the hydroxl of the oxy acid. Needless to say, just as one can form a trimolecular acid, such as triricinoleic acid, likewise, one can combine two molecules of oxy-hendecenoic acid with one molecule of a dibasic carboxy acid by reaction involving the two carboxyl radicals of the dibasic acid. Likewise, any other alcohol acid type of material such as ricinoleic acid, hydroxystearic acid, or the condensation product of ethylene glycol with oxalic acid, or with phthalic acid, or with maleic acid, may serve as a bridge or a connecting link by combination with a molecule of oxy-hendecenoic acid and a molecule of a dibasic carboxy acid. Such material must be amphoteric, if it can be employed to combine with a hydroxyl radical of an oxy acid and the carboxyl radical of a dibasic carboxy acid. Obviously, where it combines with the carboxyl of an acid, one may use an oxy acid material in which there is no free carboxyl, such as a salt or ester. Likewise, in any case where a carboxylic hydrogen remains, such carboxylic hydrogen may be converted into salt by neutralization with a suitable base, such as sodium hydroxide, potassium hyroxide, calcium hydroxide, triethanolamine, etc. Such free carboxylic hydrogen may be converted into an ester, such as methyl ester, ethyl ester, propyl ester, or into an aromatic, cyclic or aralkyl ester.

Other means of combination are readily available, such as the formation of a diglyceride in which a molecule of oxy-hendecenoic acid and a molecule of a dibasic carboxy acid are united with a molecule of glycerol, so as to leave one hydroxyl group and one carboxyl group uncombined. Likewise, such reaction could be continued so as to yield a triglyceride free from any uncombined hydroxyl or carboxyl groups. Likewise, two molecules of oxy-hendecenoic acid could be reacted with one molecule of glycerol, and subsequently, further reacted with one molecule of a dibasic carboxy acid, so as to yield a product in which there is a residual carboxyl group. One molecule of oxy-hendecenoic acid and one molecule of a dibasic carboxy acid can be united by means of ethylene glycol or some similar glycol.

As previously remarked, where oxy-hendecenoic acid is acting by virtue of its alcoholic hydroxyl, i. e., acting as an alcohol, one need not employ the acid itself, but one may employ any suitable salt, such as a sodium salt, ammonium salt, potassium salt or an amine salt, such as a triethanolamine salt, etc. Where the oxy acid is acting by virtue of its carboxylic hydrogen, one need not employ the acid itself, but one might employ a combination wherein the alcoholic hydroxyl has already combined with some other acid, such as ricinoleic acid. All these reactions are essentially esterification reactions. Esterification reactions are best promoted at a fairly high temperature, and preferably slightly above the boiling point of water. The passing of dry hydrochloric acid gas hastens the reaction. Any conventional means may be employed to hasten these reactions, such as the passing of dry carbonic acid gas, or any other inert gas through the mixture.

I prepare the treating agent or demulsifying agent employed in my present process in the following manner:

220 lbs. of oxy-hendecenoic acid of technical purity are mixed with 202 lbs. of sebacic acid of techincal purity, and after thorough mixing, there is added thereto 92 lbs. of glycerol. The mixture is heated to approximately 110° C. and dry carbon dioxide gas is passed through the mixture with constant stirring, until the acid value remains constant, based on test of samples taken at hourly intervals. If the reaction does not proceed rapidly enough, a higher temperature, for instance, 125 to 135° C., may be employed. If desired, dry hydrochloric gas, or even dried air, may be substituted for the dry carbonic acid gas. The product thus obtained forms a very efficient demulsifying agent, especially after dilution with some suitable solvent, so as to reduce its viscosity. One or more of the following will serve as a suitable solvent: benzol, solvent naphtha, kerosene, or propyl alcohol.

If desired, any free acidity which is present in the preferred reagent or demulsifying agent just described, may be neutralized by triethanolamine, or by any other suitable amine, such as monoamylamine, benzylamine, etc. The free acidic carboxyl may be converted into a salt, such as sodium, potassium, or ammonium salt. The free acidic carboxyl, of course, may be combined with an alcohol, such as ethyl, methyl, or propyl alcohol, or with glycerol.

Conventional demulsifying agents employed in the treatment of oil field emulsions are used as such, or after dilution with any suitable solvent, such as water; petroleum hydrocarbons, such as gasoline, kerozene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfoaromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of my present process.

In practising my process a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound characterized by the presence of both an oxy-hendecenoic acid residue and a dicarboxy acid residue in the same molecule; said dicarboxy acid residue being derived from an acid of the formula type $(CH_2)_n(COOH)_2$, in which $n$ has a value of at least 5 and not more than 8.

2. A process for breaking petroleum emulsions of the water-in-oil type, which consists in subjecting the emulsion to the action of a demulsifying agent comprising a chemical compound in the form of a salt, characterized by the presence of both an oxy-hendecenoic acid residue and a dicarboxy acid residue in the same molecule; said dicarboxy acid residue being derived from an acid of the formula type $(CH_2)_n(COOH)_2$, in which $n$ has a value of at least 5 and not more than 8.

3. A process for breaking petroleum emulsions of the water-in-oil type, which consists in subjecting the emulsion to the action of a demulsifying agent comprising a chemical compound in the form of an acid, characterized by the presence of both an oxy-hendecenoic acid residue and a dicarboxy acid residue in the same molecule; said dicarboxy acid residue being derived from an acid of the formula type $(CH_2)_n(COOH)_2$, in which $n$ has a value of at least 5 and not more than 8.

4. A process for breaking petroleum emulsions of the water-in-oil type, which consists in subjecting the emulsion to the action of a demulsifying agent comprising a chemical compound in the form of an ester, characterized by the presence of both an oxy-hendecenoic acid residue and a dicarboxy acid residue in the same molecule; said dicarboxy acid residue being derived from an acid of the formula type $(CH_2)_n(COOH)_2$, in which $n$ has a value of at least 5 and not more than 8.

MELVIN DE GROOTE.